United States Patent
Kang et al.

(10) Patent No.: US 9,805,626 B2
(45) Date of Patent: Oct. 31, 2017

(54) RESPIRATION MIMIC DEVICE

(71) Applicant: The Catholic University of Korea Industry-Academic Cooperation Foundation, Seoul (KR)

(72) Inventors: Young Nam Kang, Seoul (KR); Hong Seok Jang, Seoul (KR); Ja Choon Koo, Seoul (KR); Ji Na Kim, Seoul (KR); Hun Joo Shin, Incheon (KR); Young Kyu Lee, Seoul (KR); Jae Choon Lee, Gyeonggi-do (KR); Hyoung Wook Park, Gyeonggi-do (KR); Hyuk Jin Lee, Gyungsangnam-do (KR); Hae Jin Lee, Incheon (KR)

(73) Assignee: THE CATHOLIC UNIVERSITY OF KOREA INDUSTRY-ACADEMIC COOPERATION FOUNDATION, Seoul (KR)

( * ) Notice: Subject to any disclaimer, the term of this patent is extended or adjusted under 35 U.S.C. 154(b) by 360 days.

(21) Appl. No.: 14/542,605

(22) Filed: Nov. 16, 2014

(65) Prior Publication Data

US 2015/0317918 A1 Nov. 5, 2015

(30) Foreign Application Priority Data

Apr. 30, 2014 (KR) ........................ 10-2014-0052612

(51) Int. Cl.
| | | |
|---|---|---|
| *G09B 23/32* | (2006.01) | |
| *G09B 23/30* | (2006.01) | |
| *G09B 23/28* | (2006.01) | |

(52) U.S. Cl.
CPC ........... *G09B 23/32* (2013.01); *G09B 23/303* (2013.01); *G09B 23/288* (2013.01)

(58) Field of Classification Search
CPC ....... G09B 23/30; G09B 23/303; G09B 23/32
(Continued)

(56) References Cited

U.S. PATENT DOCUMENTS

| 7,728,285 B2 * | 6/2010 | Suh ...................... A61N 5/1048 250/252.1 |
|---|---|---|
| 2008/0193904 A1 * | 8/2008 | Santhanam ............ G09B 23/28 434/272 |

(Continued)

FOREIGN PATENT DOCUMENTS

| KR | 10-2007-0118394 A | 12/2007 | |
|---|---|---|---|
| NO | WO 2005032327 A2 * | 4/2005 | ............. G09B 23/28 |

OTHER PUBLICATIONS

Lalwani, Giddabasappa, Li, Olson, Simmons, Shojaei, Arsdale, Christensen, Jackson-Fisher, Wong, Lappin, Eswaraka; Contrast Agents fo Quantitative MicroCT of Lung Tumors in Mice, 2013, American Association for Labratory Animal Science, vol. 63, No. 6, p. 482-490.*

*Primary Examiner* — Sam Yao
*Assistant Examiner* — Lily M Del Valle
(74) *Attorney, Agent, or Firm* — The PL Law Group, PLLC

(57) ABSTRACT

The present invention relates to a respiration mimic device, and includes a chamber having an interior space filled with fluid, a lung mimic, to be contracted or expanded, accommodated at the interior space in the chamber; a lung copying unit including a tumor mimic distributed in the lung mimic; a driving unit for copying motion patterns of the lung according to actual respiration and contracting or expanding the lung mimic; and an abdomen copying unit for elevating vertically according to contraction or expansion of the lung mimic and copying an abdomen.

10 Claims, 4 Drawing Sheets

(58) Field of Classification Search
USPC ................................ 434/272, 267, 268, 265
See application file for complete search history.

(56) References Cited

U.S. PATENT DOCUMENTS

2008/0298540 A1\* 12/2008 Serban .................. A61B 6/583
378/18
2010/0167251 A1\* 7/2010 Boutchko .............. A61B 5/416
434/267

\* cited by examiner

RESPIRATION MIMIC DEVICE

CROSS-REFERENCE TO RELATED APPLICATION AND CLAIM OF PRIORITY

The application claims the benefits of the Korean Patent Application No. 10-2014-0052612 filed on Apr. 30, 2014 in the Korea Intellectual Property Office, the disclosures of which are incorporated herein in their entirety by reference.

BACKGROUND

1. Technical Field

The present invention relates to a respiration mimic device for accurately reflecting dynamic patterns of a human body changing according to respiration by reflecting actual respiration patterns of a patient.

2. Description of the Related Art

Treatment radiation of medical radiation is applied to a tumor of a cancer patient to die cancer cells or to not breed them, thereby to die the cancer cells on reaching the end of those life spans and to treat a cancer or to reduce pain of the patient.

Radiotherapy using such a treatment radiation is performed to prevent recurrence or in case of not performing surgery, or in the case that the radiotherapy is more efficient than the surgery, or in case of enhancing the quality of life for the patient by concurrently doing the surgery and radiotherapy, or to maximize an anti-cancer effect on doing chemotherapy, when there are the remaining cancer cells, for example, after doing the surgery.

The radiotherapy is performed by a medical equipment including a radiation generation device such as a linear accelerator.

The linear accelerator may output X-rays or electron-rays having high energy, may minutely control output dose, and therefore is used now as a standard equipment for radiotherapy.

However, it is important to properly control radiation dose outputted from a radiotherapy device on performing the radiotherapy. Since the radiation having optimum dose corresponding to a state or size or depth of the tumor should be illuminated to acquire a maximum treatment effect, it is very important that the linear accelerator outputs the radiation having the optimum dose.

Therefore, prior to usage of the radiotherapy device, operational preciseness, such as whether the accelerator is properly operated and particularly whether the radiation having necessary dose is outputted after normally controlling radiation dose, should be confirmed already. Further, it is preferable that dosage measurement for such a radiation measures the radiation illuminated into the specific portion in the body of the patient to be actually treated.

The one used for this purpose is called phantom, which is a measurement apparatus capable of measuring the radiation instead of the human body, in the medical field.

However, the phantom is an equipment for copying a part of the human body and therefore it is necessary that the phantom reflects the movement of internal organs such as the respiration movement of the human body to measure the distribution of the radiation dose actually irradiated into the specific portion of the human body. The device necessary for performing above contents is a respiration mimic device.

However, a prior respiration mimic device was limited to actually reflect the respiration pattern of the patient.

SUMMARY

An advantage of some aspects of the invention is that it provides a respiration mimic device for accurately reflecting dynamic patterns of a human body changing according to respiration by reflecting actual respiration patterns of a patient.

According to an aspect of the invention, there is provided a respiration mimic device including a lung copying unit including a chamber having an interior space filled with fluid, a lung mimic, to be contracted or expanded, accommodated at the interior space in the chamber, and a tumor mimic distributed in the lung mimic; a driving unit for copying motion patterns of the lung according to actual respiration and contracting or expanding the lung mimic; and an abdomen copying unit for elevating vertically according to contraction or expansion of the lung mimic and copying an abdomen According to an embodiment of the present invention, contrast medium is accommodated inside the tumor mimic, and the tumor mimic is modified according to the contraction or expansion of the lung mimic.

According to an embodiment of the present invention, the driving unit includes a driving rod in which one end is coupled with the lung mimic and the other end, protruded outside, penetrates the chamber; a rack longitudinally formed in the driving rod; a pinion geared with the rack; and a driving motor for rotating the pinion.

According to an embodiment of the present invention, the respiration mimic device further includes a movable plate, coupled with the driving rod in the chamber, in which the outer periphery thereof is adhered and moved with an inner wall of the chamber.

According to an embodiment of the present invention, the respiration mimic device further includes a pressure controller coupled with an outer wall of the chamber and formed with a hollow unit, communicating with the interior of the chamber, for passing the fluid in the chamber by moving the movable plate.

According to an embodiment of the present invention, the abdomen copying unit includes a first rod in which one end is hinge-coupled with the driving rod; a second rod, in which one end is hinge-coupled with a fastener, hinge-coupled with the first rod to cross with the first rod; and a supporting plate coupled with the other end of the first rod and the other end of the second rod to be slid.

According to an embodiment of the present invention, the respiration mimic device further includes a sensor, positioned in the supporting plate, for measuring the elevating degree of the supporting plate.

According to an embodiment of the present invention, the respiration mimic device includes a movable rod in which one end is coupled with one end of the first rod; and a sliding groove for guiding the moving of the other end of the movable rod, and further includes a measuring unit for measuring the contraction and expansion degree of the lung mimic according to the moving of the other end of the movable rod.

According to an embodiment of the present invention, the respiration mimic device further includes stoppers, coupled with the measuring unit, respectively, across the other end of the movable rod, for controlling normal rotation or backlashing for the driving motor according to contact of the other end of the movable rod.

According to an embodiment of the present invention, the respiration mimic device further includes an air vent, disposed at a sidewall of the chamber to communicate with the lung mimic, for passing air according to the contraction or expansion of the lung mimic.

According to an embodiment of the present invention, the respiration mimic device further includes an air pump, connected to the air vent, for injecting air into the lung mimic or discharging air from the lung mimic.

DETAILED DESCRIPTION

The present invention may have various embodiments with various transformations, and the detailed description will be described with reference to the drawings showing specific embodiments However, the present invention is not defined to the specific embodiments by the detailed description, and should be understood to include all transformations, equivalents or substitute to be included in ideas and technical range of the present invention. In the description of the present invention, when the detailed description for the known technology to be related may blur the gist of the present invention, the detailed description will be omitted.

Terms used in the specification, 'first', 'second', etc. can be used to describe various components, but the components are not to be construed as being limited to the terms. The terms are only used to differentiate one component from other components.

It is to be understood that when one element is referred to as being "connected to" or "coupled to" another element, it may be connected directly to or coupled directly to another element or be connected to or coupled to another element, having the other element intervening therebetween.

Hereinafter, embodiments of the invention will be described with reference to the attached drawings.

Figure 1:
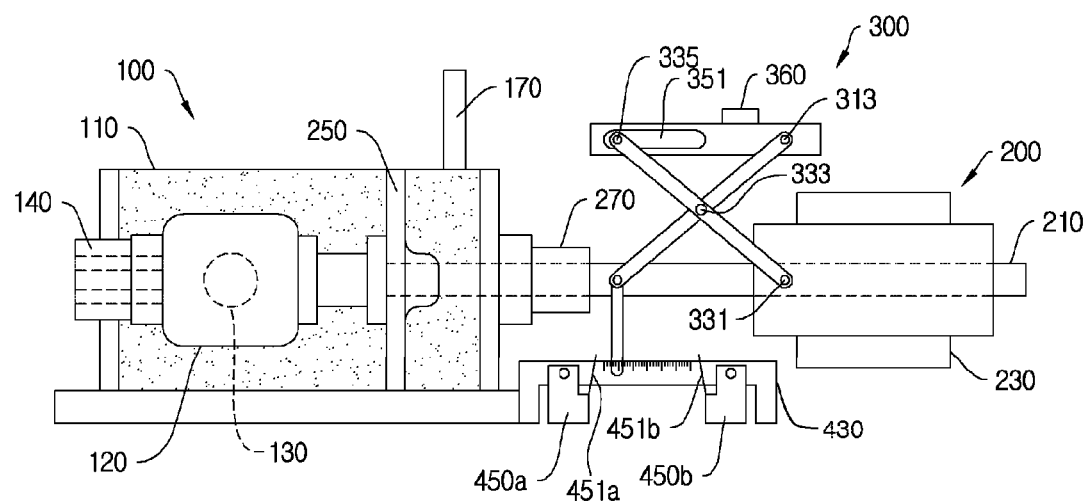
FIG. 1 schematically shows a respiration mimic device according to an embodiment of the prevention invention.
Figure 2:
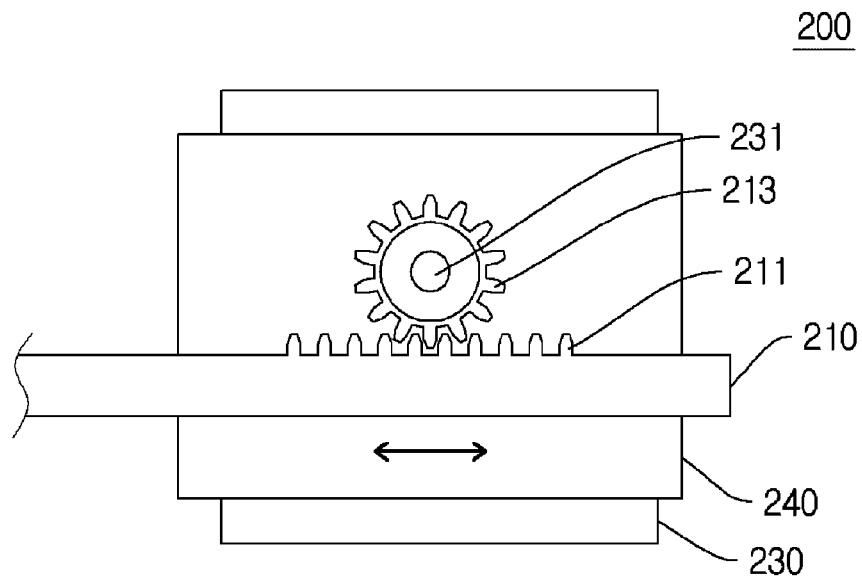
FIG. 2 schematically shows a driving unit of the respiration mimic device according to the embodiment of the prevention invention.
Figure 3:
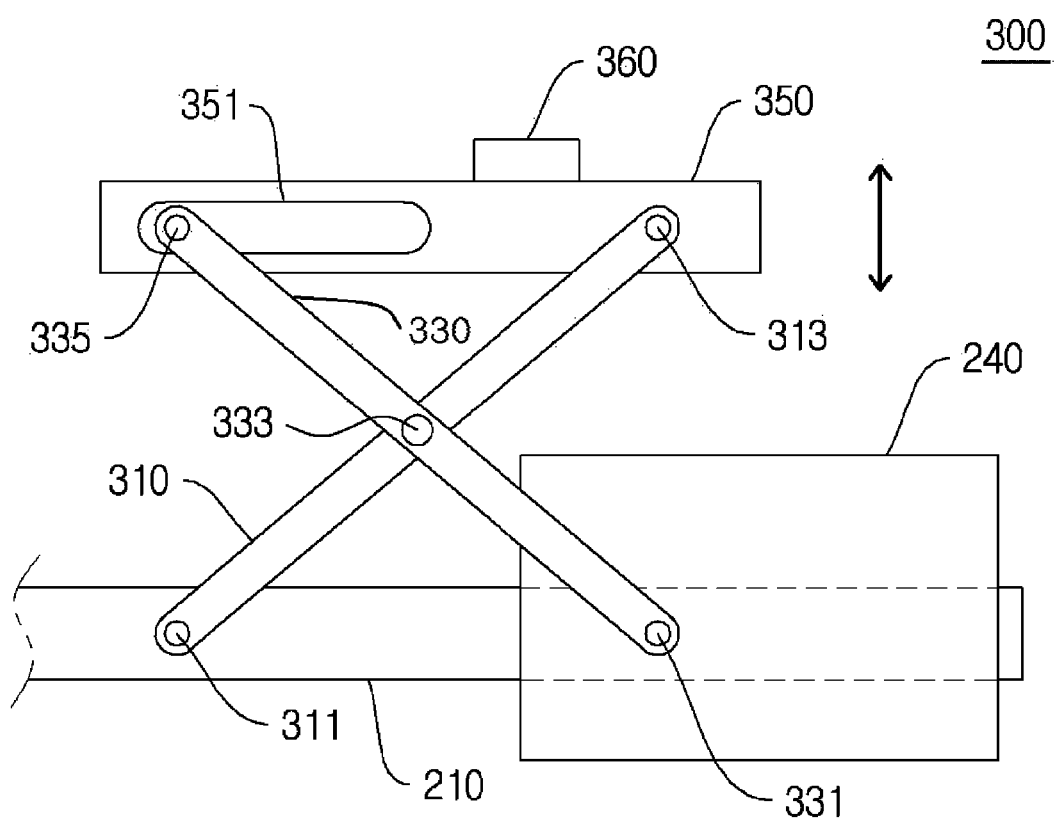
FIG. 3 schematically shows an abdomen copying unit of the respiration mimic device according to the embodiment of the prevention invention.
Figure 4:
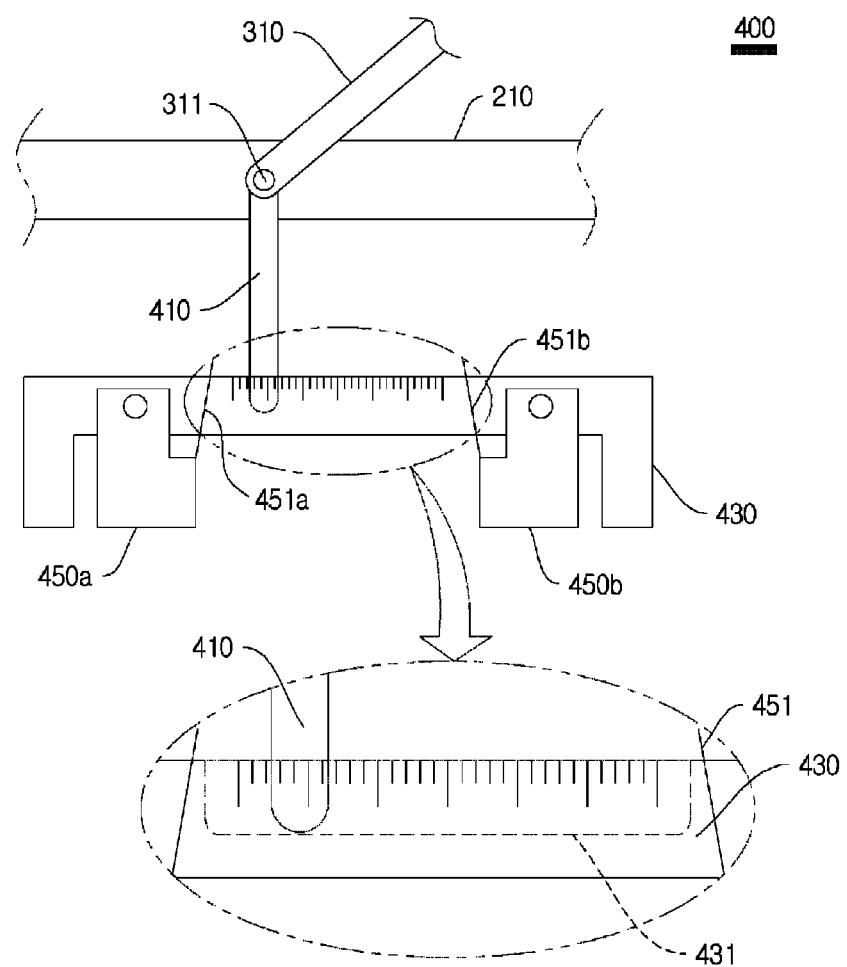
FIG. 4 schematically shows a measuring unit of the respiration mimic device according to the embodiment of the prevention invention.
Figure 5:
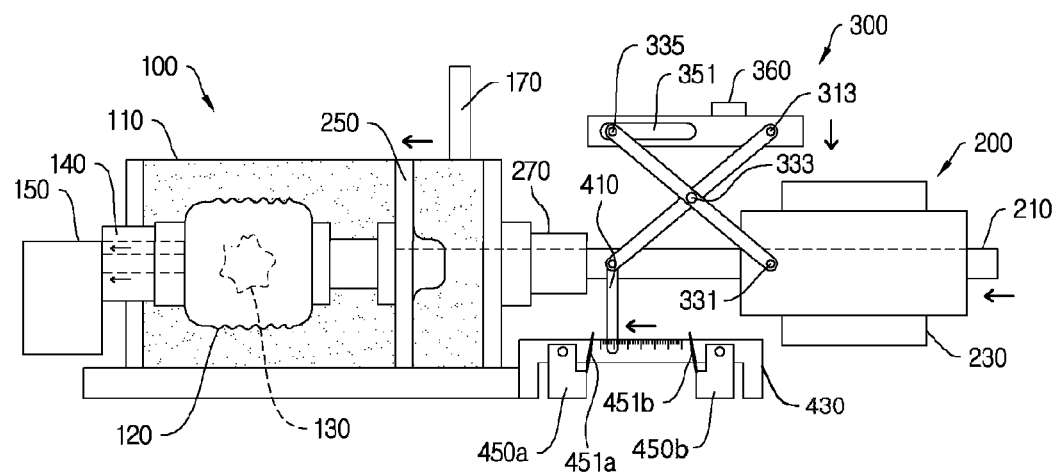
FIG. 5 and FIG. 6 show operations of the respiration mimic device according to the embodiment of the prevention invention.
Figure 6:
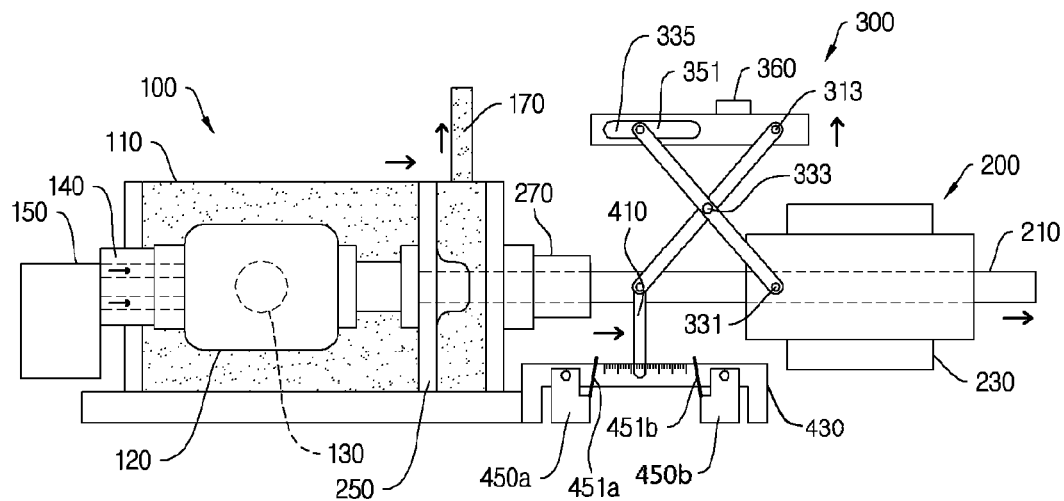

FIG. 1 schematically shows a respiration mimic device according to an embodiment of the prevention invention, FIG. 2 schematically shows a driving unit of the respiration mimic device according to the embodiment of the prevention invention, FIG. 3 schematically shows an abdomen copying unit of the respiration mimic device according to the embodiment of the prevention invention, FIG. 4 schematically shows a measuring unit of the respiration mimic device according to the embodiment of the prevention invention, and FIG. 5 and FIG. 6 show operations of the respiration mimic device according to the embodiment of the prevention invention.

FIG. 1 to FIG. 6 show a lung copying unit 100, a chamber 110, a lung mimic 120, a tumor mimic 130, an air vent 140, an air pump 150, a pressure controller 170, a driving unit 200, a driving rod 210, a rack 211, a pinion 213, a driving motor 230, a driving motor axis 231, a driving case 240, a movable plate 250, a driving rod supporting unit 270, an abdomen copying unit 300, a first rod 310, a second rod 330, hinge pins 311, 331, 333, a connection pin 335, a supporting plate 350, a sliding slit 351, a sensor 360, a measuring part 400, a movable rod 410, a measuring unit 430, a movable groove 431, stoppers 450a, 450b, and switches 451a, 451b.

A respiration mimic device in the present embodiment includes a lung copying unit 100, a driving unit 200, and an abdomen copying unit 300.

Referring to FIG. 1, the lung copying unit 100 includes a chamber 110 having an interior space filled with liquid, a lung mimic 120, to be contracted or expanded, accommodated at the interior space in the chamber 110, and a tumor mimic 130 distributed in the lung mimic 120.

The chamber 110 may be configured with a cylindrical shape and is filled with the liquid at the interior space thereof. At this time, the liquid may be water. The chamber 110 is corresponded to a thoracic cavity positioned with the lung of a human body, and the liquid in the chamber 110 is corresponded to pleural fluid.

The lung mimic 120 is accommodated at the interior space of the chamber 110, and is contracted or expanded by driving the driving unit 200. The lung mimic 120 may be formed with synthetic resin such as sponge having gaps.

The tumor mimic 130 is distributed in the lung mimic 120. The tumor mimic 130 is moved together with the lung mimic 120 and we see the tumor having the changed shape by the captured image. The tumor mimic 130 may be formed by filling water into a pouch having latex material, and the shape thereof is modified according to contraction or expansion of the lung mimic 120. Radiation contrast medium is injected inside the tumor mimic 130. The contrast medium is a medicine allowing tissues or blood vessels to observe on performing radiography. When the contrast medium is injected into the tumor mimic 130, it is possible to accurately observe movement of the tumor mimic 130 according to contraction or expansion of the lung mimic 120.

The driving unit 200 contracts or expands the lung mimic 120 by copying motion patterns of the lung according to actual respiration. The driving unit 200 is coupled with the lung mimic 120 to contract or expand to the lung mimic 120 in the chamber 110. This is to copy motions allowing the lung to contract or expand according to actual respiration.

The abdomen copying unit 300 is vertically elevated according to contradiction or expansion of the lung mimic 120 to copy an abdomen.

The lung mimic 120 is contracted or expanded by the driving unit 200, and the abdomen copying unit 300 is horizontally elevated in response to it and therefore copies the movement of the abdomen according to actual respiration. The driving unit 200 may include a driving rod 210, a rack 211, a pinion 213 and a driving motor 230, as shown in FIG. 2.

One end of the driving rod 210 is coupled with the lung mimic 120, and the other end of it penetrates the chamber 110 and may be protruded outside. One end of the driving rod 210 rectilinearly reciprocates in the chamber 110 to contract or expand the lung mimic 120.

At this time, the driving rod 210 may be supported by a driving rod supporting unit 270 disposed at an outer wall of the chamber 110.

The driving rod supporting unit 270 supports the driving rod 210 to smoothly perform rectilinear motion of the driving rod 210 and to prevent fluid in the chamber 110 from discharging outside.

The rack 211 is longitudinally formed in the driving rod 210, the pinion 213 is geared with the rack 211, and the driving motor 230 rotates the pinion 213.

The rectilinear motion of the driving rod 210 rotates the rack 211 disposed at the driving rod 210 and the pinion 213 geared with the rack 211. That is, the driving of the driving motor 230 rotates the pinion 213 formed at the driving motor axis 231 and rectilinearly motions the rack 211 geared with the pinion 213, and it is possible to rectilinearly motion the driving rode 210 coupled with the rack 211.

At this time, the driving performed by a gear structure between the pinion 213 and rack 211 may be performed in the driving case 240, and the driving case 240 supports one end of the driving rod 210.

The driving rod 210 is rectilinearly motioned by the rack 211, the pinion 213, and the driving motor 230 in the present embodiment, but it is also possible to rectilinearly motion the driving rod 210 by coupling other rectilinear motion devices such as a linear motor with the driving rod 210.

On the other hand, the respiration mimic device in the present invention is coupled with the driving rod 210 in the chamber 110, and an outer periphery thereof further includes a movable plate 250 to be adhered and moved to an inner wall of the chamber 110.

The movable plate 250, which is a configuration corresponding to a diaphragm of a body, partitions an interior space of the chamber 110, is coupled with the driving rode 210 and therefore moves in the direction of the lung mimic 120 (the left direction on the drawings and refer to a first direction) on contracting the lung mimic 120 and moves in the opposite direction thereof (the right direction on the drawings and refer to a second direction) on expanding the lung mimic 120.

The outer periphery of the movable plate 250 is adhered and moved to the inner wall of the chamber 110, and the outer periphery of the movable plate 250 may be formed with an O-ring for increasing adhesion.

At this time, the outer wall of the chamber 110 may be included with a pressure controller 170 for controlling pressure at the inner space in the chamber 110.

The pressure controller 170 is coupled with the outer wall of the chamber 110, and is formed with a hollow unit, communicating with the interior of the chamber 110, for passing the fluid in the chamber 110 by moving the movable plate 250.

The movable plate 250 moves in the second direction in the chamber 110 on expanding the lung mimic 120, and at this time, the pressure at the interior space on the right in the chamber 110 based on the movable plate 250 is increased. In this case, the chamber 110 may be destroyed by the pressure to be increased, and therefore the fluid in the chamber 110 is introduced into the hollow unit of the pressure controller 170 to control the pressure of the chamber 110.

The pressure controller 170 in the present embodiment is coupled with the chamber 110 so that one end thereof has the closed pipe shape and the other end thereof is communicated with the chamber 110. Therefore, the pressure controller 170 is positioned at the outer wall of the chamber 110, and the pressure controller 170 may be a pipe shape.

On the other hand, the abdomen copying unit 300 in the present embodiment may include a first rod 310, a second rod 330, and a supporting plate 350, as shown in FIG. 3.

The abdomen copying unit 300 is vertically elevated according to contradiction or expansion of the lung mimic 120 to copy an abdomen of the body.

One end of the first rod 310 is hinge-coupled with the driving rod 200 by a hinge pin 311, and the other end of the first end 310 is hinge-coupled with the supporting plate 350.

The second rode 330 is hinge-coupled with a fastener, and is hinge-coupled with the first end 310 to cross with the first end 310. That is, the first rod 310 and second rod 330 are hinge-coupled by the hinge pin 333 so that they may be rotated in a schematically 'X-form' shape, and one end of the second rod 330 is hinge-coupled with the fastener by the hinge pin 331. At this time, the fastener is fixed to the ground, etc. and therefore does not move, and a driving case 240 is used as the fastener in the present embodiment.

The supporting plate 350 is coupled with the other end of the first rod 310, and the other end of the second rod 330 to be slid.

At this time, the other end of the first rod 310 is hinge-coupled with one side of the supporting plate 350 by the hinge pin 313, and the other end of the second rod 330 is coupled with a sliding slit 351 formed at the supporting plate 350 so that a connection pin 335 is slid.

On contracting the lung mimic 120, one end of the first rod connected to the driving rod 210 moves in the first direction and the other end of the second rod 330 moves in the first direction by the sliding slit 351, thereby to lower the supporting plate. On expanding the lung mimic 120, one end of the first rod connected to the driving rod 210 moves in the second direction and the other end of the second rod 330 moves in the second direction by the sliding slit 351, thereby to raise the supporting plate 350 and to copy the abdomen.

In this case, the respiration mimic device in the present embodiment includes a sensor 360 for measuring the elevating degree of the supporting plate 350.

The sensor 360 positioned at the supporting plate 350, for measuring the measuring the elevating degree of the supporting plate 350, may be a position sensor or pressure sensors.

The position sensor for sensing up/down positions of the supporting plate 350 is positioned at the supporting plate 350, and the pressure sensors wrap the supporting plate 350 and some of it are disposed at a band having an elastic material connected to the fastener and may sense the pressure applied to the sensor by moving the supporting plate 350.

Such a sensor 360 for acquiring data for synchronizing movement of the abdomen copying unit 300 with the movement of the abdomen on actually respiring accurately copies movement of the lung according to the movement of the tumor on actually respiring. The abdomen copying unit 300 reflects actual respiration patterns of patients by reflecting the movement of the abdomen according to respiration of the patients, thereby to accurately reflect dynamic patterns of the lung of the patient according to the respiration.

The respiration mimic device in the present embodiment further includes a movable rod 410 and a measuring unit 430, as shown in FIG. 4. The movable rod 410 is coupled with one end of the first rod 310, and the measuring unit 430 measures moving distance of the driving rod 210 according to the moving of the other end of the movable rod 410.

The movable rod 410 may be downwardly extended from one end of the first rod 310, and indicates the moving distance of the driving rod 210 to the measuring unit 430 by coupling to be slid into the measuring unit 430. Further, it operates switches 451a, 451b coupled with stoppers 450a, 450b to be described later.

An upper side of the measuring unit 430 may be formed with a movable groove 431, and the movable rod 410 is slid-moved along with the movable groove 431. Further, one side of the measuring unit 430 is displayed with gradations, thereby to measure the moving distance of the driving rod 210 with an eye according to the moving of the movable rod 410.

Both ends of the measuring unit 430 may be formed with a pair of stopper 450a, 450b. Each stopper 450a, 450b is coupled with the measuring unit 430 across the other end of the movable rod 410, and controls normal rotation or backlashing for the driving motor 230 according to contact of the other end of the movable rod 410.

One side of the stopper 450a, 450b may be formed with switches 451a, 451b, and a controller (not shown) operates rotation of the driving motor 230 in a direction opposite to the driving direction when the other end of the movable rod 410 contacts the switches 451a, 451b to operate them. Therefore, it controls contraction or expansion degree of the lung mimic 120.

The chamber 110 may be formed with an air vent 140. The air vent 140 is disposed at a sidewall of the chamber 110 to communicate with the lung mimic 120, and air in the lung mimic 120 passes through the air vent 140 according to the contraction or expansion of the lung mimic 120.

The lung mimic 120 is formed by porous synthetic resin material such as a sponge, and therefore discharges/introduces air outside/inside the chamber 110 through the air vent 140 by the contract and expansion of the lung mimic 120.

In addition, the air vent 140 may be connected with an air pump 150. The air pump 150 injects air into the lung mimic 120 through the air vent 140 or discharges air from the lung mimic 120. This is to increase charge/discharge amount of air by the air pump 150 because air may be not adequately supplied or discharged into the lung mimic 120 by the contraction or expansion only of the lung mimic 120 performed by the driving rod 210.

Hereinafter, operations of the respiration mimic device are described with reference to FIG. 5 and FIG. 6.

FIG. 5 show operations of the respiration mimic device on contracting the lung mimic 120. When the driving motor 230 performs normal rotation and drives the driving rod 210 in a first direction, one end of the first rod 310 hinge-coupled with the driving rod 210 moves in the first direction and the other end of the second rod 330 moves in the first direction through the sliding slit 351, thereby to lower the supporting plate 350. Further, the driving rod 210 contracts the lung mimic 120, and the tumor mimic 130 inside is moved/contracted according to the contraction of the lung mimic 120. When the driving rod 210 contracts the lung mimic 120, air is discharged outside from the contracted lung mimic 120 through the air vent 140 to increase the discharge amount of air using the air pump 150.

On the other hand, on moving the driving rod 210 in the first direction, when the movable rod 410 contacts the switch 451a coupled with the stopper 450a and operates it, the controller (not shown) drives the driving motor 230 in backlashing and an expansion process for the lung mimic 120 is proceeded.

FIG. 6 show operations of the respiration mimic device on expanding the lung mimic 120. When the driving motor 230 performs backlashing and drives the driving rod 210 in a second direction, one end of the first rod 310 coupled with the driving rod 210 moves in the second direction and the other end of the second rod 330 moves in the second direction through the sliding slit 351, thereby to raise the supporting plate 350. On the other hand, the movable plate 250 coupled with the driving rod 210 according to the moving of the driving rod 210 moves in the second direction to increase the pressure in the chamber 110, and the fluid in the chamber 110 moves through the pressure controller 170 coupled to be communicated to the chamber 110 to control the pressure in the chamber 110. Further, the driving rod 210 expands the lung mimic 120, and the tumor mimic 130 inside is moved/contracted according to the expansion of the lung mimic 120. When the driving rod 210 expands the lung mimic 120, air is introduced into the lung mimic 120 from the outside of the chamber through the air vent 140 to increase the introducing amount of air using the air pump 150.

On the other hand, on moving the driving rod 210 in the second direction, when the movable rod 410 contacts the switch 451b coupled with the stopper 450b and operates it, the controller (not shown) drives the driving motor 230 in normal rotation again and an contraction process for the lung mimic 120 is proceeded.

Such an operation process may copy actual respiratory movement in detail, thereby to reflect the movement of organs in the lung.

The spirit of the present invention has been just exemplified. It will be appreciated by those skilled in the art that various modifications and alterations can be made without departing from the essential characteristics of the present invention.

According to an embodiment of the present invention, the present invention may accurately copy dynamic patterns of a human body changing according to respiration by reflecting actual respiration patterns of a patient.

What is claimed is:

1. A respiration mimic device, comprising:
   a lung simulant including a chamber having an interior space filled with fluid, a lung mimic, to be contracted or expanded, accommodated at the interior space in the chamber, and a tumor mimic distributed in the lung mimic;
   a driving unit for copying motion patterns of the lung according to actual respiration and contracting or expanding the lung mimic; and
   an abdomen simulant for elevating vertically according to contraction or expansion of the lung mimic and copying an abdomen, the abdomen simulant comprising:
      a first rod in which one end is hinge-coupled with the driving rod;
      a second rod, in which one end is hinge-coupled with a fastener, hinge-coupled with the first rod to cross with the first rod; and
      a supporting plate coupled with the other end of the first rod and coupled with the other end of the second rod to be slid.

2. The respiration mimic device according to claim 1, wherein contrast medium is accommodated inside the tumor mimic, and the tumor mimic is modified according to contraction or expansion of the lung mimic.

3. The respiration mimic device according to claim 1, wherein the driving unit includes
   a driving rod in which one end is coupled with the lung mimic and the other end, protruded outside, penetrates the chamber;
   a rack longitudinally formed in the driving rod; a pinion geared with the rack; and a driving motor for rotating the pinion.

4. The respiration mimic device according to claim 3, further comprising a movable plate, coupled with the driving rod in the chamber, in which the outer periphery thereof is adhered and moved with an inner wall of the chamber.

5. The respiration mimic device according to claim 4, further comprising a pressure controller coupled with an outer wall of the chamber and formed with a hollow unit, communicating with the interior of the chamber, for passing the fluid in the chamber by moving the movable plate.

6. The respiration mimic device according to claim 1, further comprising a sensor, positioned in the supporting plate, for measuring the elevating degree of the supporting plate.

7. The respiration mimic device according to claim 1, wherein the respiration mimic device includes
- a movable rod in which one end is coupled with one end of the first rod; and
- a movable groove for guiding the moving of the other end of the movable rod, and
- further includes a measuring unit for measuring the contraction and expansion degree of the lung mimic according to the moving of the other end of the movable rod.

8. The respiration mimic device according to claim 7, further comprising stoppers, coupled with the measuring unit, respectively, across the other end of the movable rod, for controlling normal rotation or backlashing for the driving motor according to contact of the other end of the movable rod.

9. The respiration mimic device according to claim 1, further comprising an air vent, disposed at a sidewall of the chamber to communicate with the lung mimic, for passing air according to the contraction or expansion of the lung mimic.

10. The respiration mimic device according to claim 9, further comprising an air pump, connected to the air vent, for injecting air into the lung mimic or discharging air from the lung mimic.

* * * * *